(12) United States Patent
Thurber et al.

(10) Patent No.: US 8,510,860 B2
(45) Date of Patent: Aug. 13, 2013

(54) LOCAL STORAGE OF INFORMATION PEDIGREES

(75) Inventors: Ken Thurber, Hopkins, MN (US);
Robert A. Joyce, Ithaca, NY (US); Julia A. Baker, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 204 days.

(21) Appl. No.: 13/048,713

(22) Filed: Mar. 15, 2011

(65) Prior Publication Data
US 2012/0239938 A1  Sep. 20, 2012

(51) Int. Cl.
*G06F 7/04* (2006.01)
*H04L 29/06* (2006.01)
*H04L 9/34* (2006.01)

(52) U.S. Cl.
CPC ............ *H04L 63/12* (2013.01); *H04L 29/0687* (2013.01)
USPC ............. 726/30; 713/161; 713/157; 713/176; 713/177; 713/181

(58) Field of Classification Search
None
See application file for complete search history.

(56) References Cited

U.S. PATENT DOCUMENTS

| | | | |
|---|---|---|---|
| 7,523,121 B2 | 4/2009 | Hoang et al. | |
| 7,908,281 B2 | 3/2011 | Marceau et al. | |
| 2003/0018607 A1 | 1/2003 | Lennon et al. | |
| 2004/0064335 A1 | 4/2004 | Yang | |
| 2006/0036593 A1 | 2/2006 | Dean et al. | |

OTHER PUBLICATIONS

Pedigree Management Assessment Framework. RAE Sofware. 2008.*
Data Provence in the CMS. Pancerella et al. 2005.*
The Releaseable Data Products Framework. IEEE(2001).*
Pedigree Management and Assessment in a Net-Centric Environment. Gioioso et al. Defense Transformation and Net-Centric Systems, 2007.*
M.M. Kokar et al., "Association in Level 2 fusion," Proceedings of SPIE, vol. 5434, Multisensor, Multisource Information Fusion: Architectures, Algorithms, and Applications 2004, B.V. Dasarathy, Editor, Apr. 2004, pp. 228-237.
S. Miles et al., "The requirements of recording and using provenance in e-Science experiments,"Journal of Grid Computing, 2006, 15 pgs.
R. Fjellheim et al., "AKSIO—An Application of Semantic Web technology for knowledge management in the petroleum industry," ISWC 2005, Nov. 2005, 3 pgs.
P.P. da Silva et al., "Knowledge Provenance Infrastructure," IEEE Data Engineering Bulletin, vol. 26, No. 4, Dec. 2003, 7 pgs.
J. Golbeck et al., "Trust network-based filtering of aggregated claims," Int. J. Metadata, Semantics and Ontologies Bulletin, vol. 1, No. 1, 2006, pp. 58-65.

(Continued)

*Primary Examiner* — Venkat Perungavoor
(74) *Attorney, Agent, or Firm* — Shumaker & Sieffert, P.A.

(57) ABSTRACT

This disclosure describes techniques for dynamically assembling and utilizing a pedigree of a resource. A pedigree of a resource is a set of statements that describe a provenance of the resource. As described herein, a document may include local pedigree fragments and optionally one or more pointers to remote pedigree fragments not locally stored in the document. A pedigree fragment, generally, is a data structure that specifies a direct relationship between a first resource, e.g., a primary resource, and a second resource from which an asserted fact of the first resource is derived. Because a pedigree fragment specifies such direct relationships, a set of pedigree fragments may be used to assemble the complete pedigree of resource.

44 Claims, 5 Drawing Sheets

(56) References Cited

OTHER PUBLICATIONS

H. Qi et al., "Multisensor Data Fusion in Distributed Sensor Networks Using Mobile Agents," Proc. Int'l Conf. Information Fusion, Aug. 2001, 6 pgs.

K.K. Muniswamy-Reddy et al., "Provenance-Aware Storage Systems," 2006 USENIX Annual Technical Conference, Sep. 2006, 15 pgs.

S. Koide et al., "Decision Support System for Rocket Launch Using Semantic Web Services," Advanced Intelligent Mechatronics, Proceedings, 2005 IEEE/ASME International Conference, Sep. 2005, 4 pgs.

B. Aleman-Meza et al., "Collective Knowledge Composition in a Peer-to-Peer Network: A survey for Peer-to-Peer applications," Encyclopedia of Database Technologies and Applications, Aug. 2005, 6 pgs.

A. Uszok et al., "KAoS Policy and Domain Services: Toward a Description-Logic Approach to Policy Representation, Deconfliction, and Enforcement," Fourth IEEE International Workshop on Policies for Distributed Systems and Networks (Policy '03), 2003, 4 pgs.

J. Broekstra et al., "Inferencing and Truth Maintenance in RDF Schema: Exploring a naïve practical approach," Workshop on Practical and Scalable Semantic Systems (PSSS), 2003, 14 pgs.

E.F. Codd, "A Relational Model of Data for Large Shared Data Banks," Communications of the ACM, vol. 13, No. 6, Jun. 1970, pp. 377-387.

R. Lee, "Scalability Report on Triple Store Applications," Jul. 14, 2004, http://simile.mit.edu/reports/stores/, 21 pgs.

M. McGuire et al., "Coalition Transformation: An Evolution of People, Processes and Technology to Enhance Interoperability," Agile Coalition Environment (ACE), 9th International Command and Control Research and Technology Symposium, Sep. 14-26, 2004, http://www.dodccrp.org/events/2004/ICCRTS_Denmark/CD/papers/041.pdf, 9 pgs.

* cited by examiner

LOCAL STORAGE OF INFORMATION PEDIGREES

TECHNICAL FIELD

The invention relates to computer networks and specifically to analysis of information on computer networks.

BACKGROUND

When information is presented to a user, the user may have little or no idea as to the trustworthiness of the information. One way to determine the trustworthiness of a piece of information is to identify the provenance of the piece of information. For instance, the user can determine who first created the piece of information and what other entities had the opportunity to manipulate (e.g., paraphrase, summarize, etc.) the piece of information before the piece of information was presented to the user. The user may then decide whether to trust the piece of information based on whether the user trusts the person who first created the information and whether the user trusts any entities that manipulated the piece of information prior to its presentation to the user.

SUMMARY

This disclosure describes techniques of discovering, procuring and utilizing a pedigree of a resource. As used in some examples of this disclosure, a "resource" is an instance of a concept and typically presents one or more asserted facts. Furthermore, as used in some examples of this disclosure, a pedigree of a resource is a set of statements that describe a provenance of the resource, i.e., a history of origin of the resource.

Techniques are described herein to locally store at least a portion of the pedigree data of a resource in a document. In some cases, local access to at least some of the pedigree data may reduce or eliminate the need for network communication to a centralized pedigree management system. Furthermore, local storage techniques decentralize pedigree management and, in some cases, may eliminate the need for a centralized, pedigree management system. As described herein, a document may store local pedigree data as well as pointers to any additional pedigree data that may reside within the pedigree management system. Pointers provide access to additional pedigree data stored on remote devices and, therefore, may be used to accommodate expanding quantities of pedigree data associated with a resource.

In one example, a document includes a primary resource, e.g., text, that presents one or more asserted facts. The document further includes local pedigree fragments and optionally one or more pointers to remote pedigree fragments not locally stored in the document. A pedigree fragment, generally, is a data structure that specifies a direct relationship between a first resource, e.g., a primary resource, and a second resource from which an asserted fact of the first resource is derived. Because a pedigree fragment specifies such direct relationships, a pedigree fragment may be used to assemble the pedigree of a resource.

When a system or user provides a request to retrieve the pedigree of the primary resource, one or more direct relationships may be quickly retrieved from local pedigree fragments included in the document. Such retrieval may occur without requiring access to a centralized, pedigree-management system. As such, no network communication may be required, and the pedigree of the text may therefore be accessed quickly when network connectivity is unreliable or unavailable. After retrieving the one or more direct relationships between the document and the one or more other resources, at least a recent portion of the pedigree of the document may be assembled for use by a user or system. In the event the user requires more complete pedigree information, the pointers within the document may be used to retrieve remote pedigree fragments to assemble complete pedigree for the document or at least to a degree sufficient to satisfy the user's requirements.

In some examples, a pedigree object may be used within documents to cache locally stored pedigree data as well as provide a seamless interface to remote pedigree management systems. For example, the pedigree object may specify a fixed amount of space for local pedigree information. As a consequence, the quantity of local pedigree fragments associated with a resource, e.g., the primary resource, may exceed the fixed amount of space permitted for pedigree information. When the amount of pedigree information exceeds the allotted space permitted for pedigree information, pointers within the pedigree object may identify any remote pedigree fragments. In this way, the entire pedigree of a resource remains available using pointers while conforming to the size constraints of pedigree information in a document. The pedigree management system may store the complete pedigree information or, in some cases, only the excess pedigree information that does not fit within the size constraints of the pedigree object.

In one example, a method includes receiving, by a computing device, a request to assemble a pedigree that describes a history of origin of a primary resource, the primary resource included in a document, wherein the requested pedigree of the primary resource represents the history as a set of statements that describe relationships between the primary resource and a plurality of other resources from which an asserted fact of the primary resource was derived; selecting, by the computing device, a local pedigree fragment included in the document, the local pedigree fragment specifying a first direct relationship between the primary resource and a first resource of the plurality of other resources, wherein the first direct relationship indicates that the asserted fact of the primary resource was derived from data of the first resource; selecting, by the computing device, a pointer included in the document that identifies a remote pedigree fragment not included in the document and stored on a remote device, the remote pedigree fragment specifying a second direct relationship between the first resource and a second resource of the plurality of other resources, wherein the second direct relationship indicates that the first resource was derived from the second resource; receiving, by the computing device and from the remote device, the remote pedigree fragment based on a query to the remote device, wherein the query includes the pointer; and assembling, with the computing device, the pedigree of the primary resource from the local pedigree fragment and the remote pedigree fragment.

In one example a device includes a selection module configured to receive a request to assemble a pedigree that describes a history of origin of a primary resource, the primary resource included in a document, wherein the requested pedigree of the primary resource represents the history as a set of statements that describe relationships between the primary resource and a plurality of other resources from which an asserted fact of the primary resource was derived, wherein the selection module is operable to select a local pedigree fragment included in the document that specifies a first direct relationship between the primary resource and a first resource of the plurality of other resources, wherein the first direct relationship indicates that the asserted fact of the primary resource was derived from data of the first resource; and an assembly module configured to assemble the pedigree of the primary resource from the local pedigree fragment and output the assembled pedigree.

The details of one or more embodiments of the invention are set forth in the accompanying drawings and the description below. Other features, objects, and advantages of the invention will be apparent from the description and drawings, and from the claims.

DETAILED DESCRIPTION

As illustrated in the following examples, a user may interact with a client device in a typical fashion to communicate with, access, or otherwise utilize information presented by resources within electronic documents. As used in some examples of this disclosure, a "resource" within an electronic document refers to an instance of a concept and typically presents one or more asserted facts. For example, images, animations, text, audio or recordings are all examples of resources. Moreover, these resources may be subdivided further into other resources. For example, a word processing file may contain paragraphs that are also viewed as a resource; each paragraph may also contain many concepts that are also each separately identifiable as individual resources. As used in some examples herein, a "primary" resource is the resource for which a client device has requested the pedigree. Furthermore, as used in some examples herein, the "pedigree" of a resource is a set of statements that describe provenance relationships between the resource and other resources. For instance, in implementations where statements are expressed as Resource Description Framework (RDF) triples, the pedigree of a resource is a set of statements in which the resource is a subject or an object and in which a provenance relationship is specified as the predicate.

As used in this disclosure, "information objects" or "electronic documents" may be separate files in a file system, logical units in a database, data sets available via a remote service on a computer network, or identifiers that constitute resources. Some information objects may include metadata that describes the other information stored in or asserted by the information object. As one example, one information object may uniquely identify a web page that contains a news report about the economy. The news report and certain identifiable concepts within the news report may each be viewed as separate information objects and each assigned a unique identifier, e.g., a Uniform Resource Identifier (URI).

In some examples, the data of a given information object may include many pieces of information at varying levels of granularity. Such pieces of information may individually be viewed as "resources." A "resource" in some examples is an instance of a tangible or intangible concept. For example, an electronic report may be a resource, a chart within the body of the electronic report may be a resource, a statement in the electronic report may be a resource, and an individual word in the electronic report may be a resource. Each may be logically viewed as a separate information object having its own unique identifier and traceable via the pedigree management and assessment techniques described herein.

Figure 1:
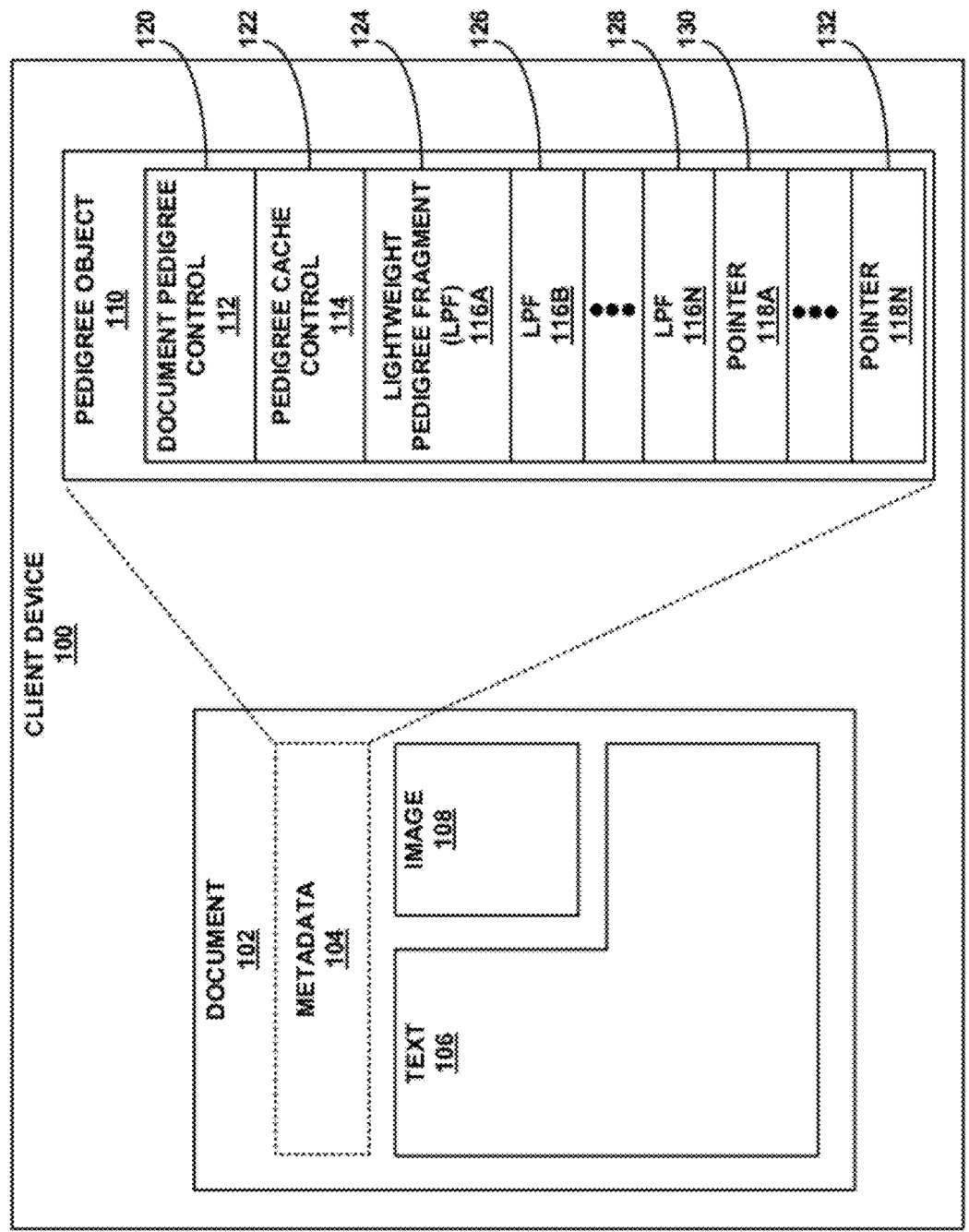
FIG. 1 is a block diagram illustrating an exemplary document that includes locally stored pedigree information.

FIG. 1 is a block diagram illustrating an exemplary client device 100 that provides an environment for viewing and editing an electronic document 102 that includes locally stored pedigree information. Electronic document 102 may be any electronic file or other container that contains content for communication to a user. Examples include word processing documents, spreadsheets, presentation files, image files, web pages, sound files and the like. Document 102 is generally an "information object" as described above, and includes pieces of information individually referred to as "resources," such as text 106 and image data 108. In addition, document 102 also includes metadata 104 that is used to store state data related document 102. For example, metadata 104 may store author information, company information, file properties and summary information, version information, author comments and other information. Metadata 104 may typically be embedded within document 102 in the form of one or more objects that encode the data. In some cases, metadata X may be encoded in a data description language, such as XML, that defines the objects and the data stored therein.

As shown in FIG. 1, metadata 104 of document 102 has been extended to include local pedigree information. In one example, local pedigree information is included in a pedigree object 110 that is embedded in metadata 104. Pedigree object 110 is a specialized object embedded within metadata 104 of document 102 to cache locally-stored pedigree data as well as provide a seamless interface to a remote pedigree management system. In this example, pedigree object 110 includes document pedigree control (DPC) 112, pedigree cache control (PCC) 114, a plurality of local pedigree fragments (LPF) 116A-116N (collectively, "LPFs 116") and, optionally, one or more pointers 118A-118N (collectively, "pointers 118").

As shown in FIG. 1, client device 100 represents any device by which a user may request or access electronic information. Client device 100 may be one of many different types of electronic devices. For example, client device 100 may be a personal computer, a laptop computer, a handheld computer, a mobile telephone, a server, a workstation, an intermediate network device, a data storage system, a supercomputer, a mainframe computer, a device built into a vehicle such as a truck, car, aircraft, watercraft, spacecraft, or other type of electronic device.

As shown in the example of FIG. 1, client device 100 stores one or more documents, e.g., document 102. In one example, document 102 is an information object that includes properties and characteristics similar to information objects previously described. Document 102 in FIG. 1 may, for example, be a web page that presents a news report. The contents of document 102 include resources such as text 106 and image data 108 that define the news report. In some examples, text 106 includes characters, words, and sentences that together consist of information intelligible to a user or system. Similarly, image data 108, in some examples, includes graphical information intelligible to a user such as pictures, charts, or other visual representations. Any of various types of resources previously described may be included in document 102 of FIG. 1.

As shown in the example of FIG. 1, pedigree information is stored in a pedigree object 110 contained within metadata 104 of document 102. Generally, pedigree object 110 is a data structure that provides efficient storage and retrieval of pedigree information. For example, pedigree object 110 may be an object, array, list, map, or other data structure embedded within document 102. In some examples, each storage location of the data structure may be referred to as a block or entry within the object. For example, as shown in FIG. 1, pedigree object 110 includes blocks that store the following: document pedigree control (DPC) 112, pedigree cache control (PCC) 114, local pedigree fragments (LPF) 116A-116N, and pointers 118A-118N. Block 124, in FIG. 1, includes LPF 116A. In one example, each block may provide 256 bytes of storage space and pedigree object 102 may be defined to include a maximum of 16 blocks, i.e., 4096 bytes or 4 kilobytes, to limit the size and impact of local pedigree information.

As shown in FIG. 1, pedigree object 110 includes LPFs 116A-116N. As described above, a pedigree fragment generally refers to a set of one or more statements specifying relationships between two resources within an electronic document. Each statement specifies a relationship between two resources. In general, a pedigree fragment may comprise a list of URIs or other identifiers of resources that are referred to in the set of statements of the pedigree fragment.

Statements in a pedigree fragment may be formatted in a variety of ways. In one example, statements in a pedigree fragment are formatted as Resource Description Framework (RDF) subject-predicate-object statements. RDF is a method of describing information by making statements about resources. According to the RDF specification, statements about resources take the form of subject-predicate-object statements. RDF subject-predicate-object statements may be formatted using RDF XML notation, Notation 3 (N3) notation, Terse RDF Triple Language (TURTLE), or another type of notation. A subject of an RDF subject-predicate-object statement denotes a first resource, an object denotes a second resource, and a predicate denotes a third resource that is associated with a relationship between the first resource and the second resource.

In an implementation where the statements of a pedigree fragment are formatted as RDF subject-predicate-object statements, each resource is associated with a unique URI. The subject part of the RDF statement specifies a URI of a first resource, the object part of the RDF statement specifies a second resource, and the predicate part of the RDF statement specifies a URI of a third resource. For example, a pedigree fragment may include a first information object that represents a first web page, a second information object that represents a second, different web page than the first, and a third information object that represents the concept of "is a source of." This statement may unambiguously express the notion that the first web page represented by first information object is a source of the second web page represented by the second information object. Statements in a pedigree fragment may describe "local" relationships between a resource and other resources. A statement that describes a "local" relationship with respect to a particular resource if the statement describes a provenance relationship in which the resource is specified as the subject of the relationship.

Figure 4:
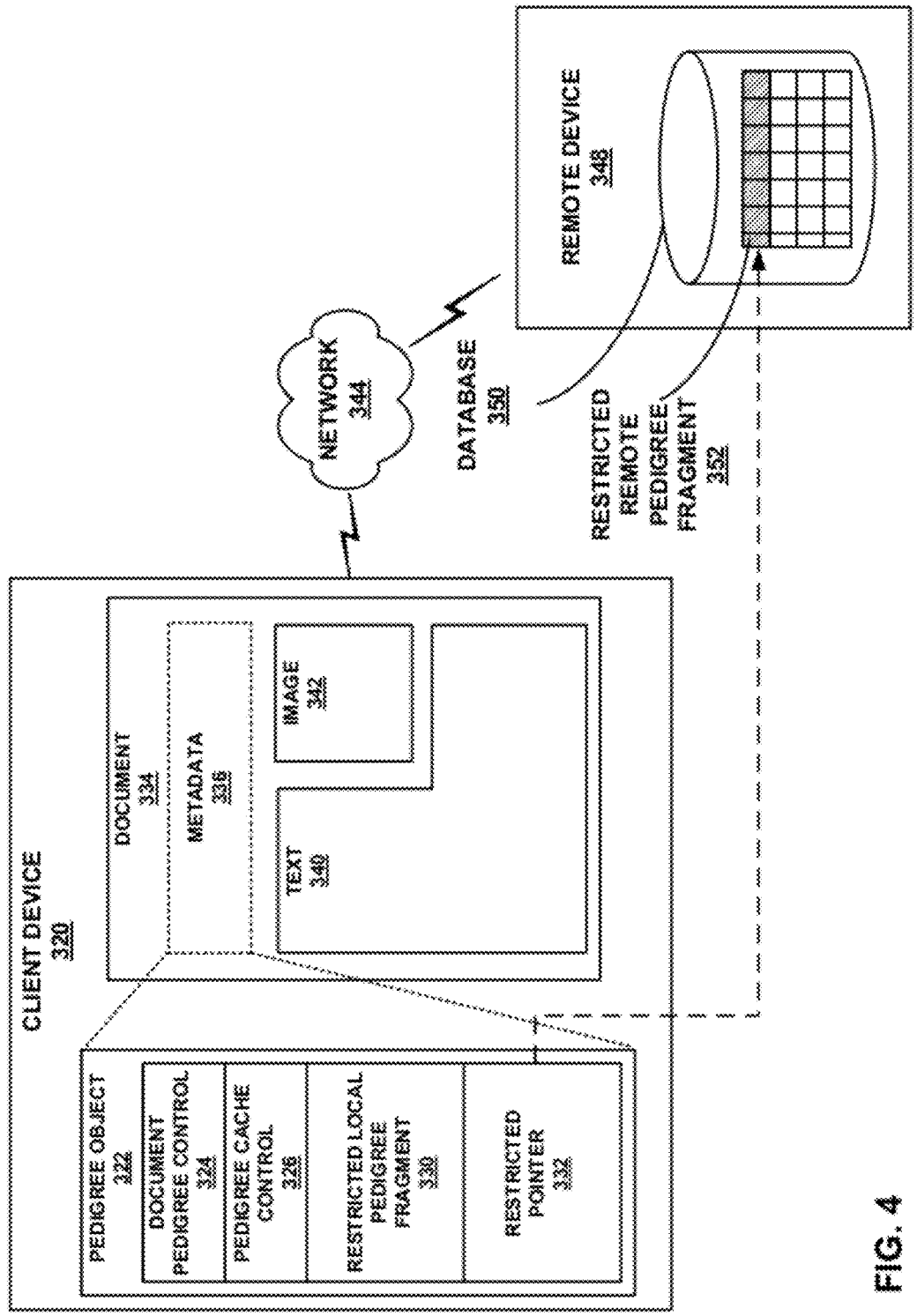
FIG. 4 is a block diagram illustrating a document that includes restricted pedigree information stored in a pedigree object.

Examples of pedigree fragments include local pedigree fragment 116A, remote pedigree fragment 404 (shown in FIG. 5), and restricted local pedigree fragment 330 (shown in FIG. 4). In one example, the relationships defined by the one or more statements of a local pedigree fragment specify a pedigree between the two resources. Examples of such statements that define relationships between two resources are further illustrated in, e.g., FIGS. 1. In one example, LPF 116A may include a statement that specifies a relationship between image data 108 and a second resource. The statement may specify, for example, that the second resource "is a source of" image data 108. In this way, pedigree information of image data 108 may be efficiently stored and retrieved in document 102.

In some examples, multiple LPFs are stored locally within document 102. For example, as shown in FIG. 1, LPFs 116 are each stored locally within pedigree object 110, which is further included in document 102. In one example of FIG. 1, LPFs 116 specify pedigree information for image data 108. For example, LPF 116A may specify that a second resource is a source of image data 108. LPF 116B may in turn include one or more statements that indicate a third resource is a source of the second resource. Similarly, LPF 116C may include pedigree information that a fourth resource is a source of the third resource. In this way, the pedigree of a resource, e.g., image data 108, may be stored and retrieved locally within document 102. Thus, a user may use the pedigree information of LPFs 116 to determine, for example, that the fourth resource is a source of image data 108. Storing pedigree locally in a document advantageously eliminates the need for a centralized server, thereby decreasing the amount of time required to retrieve pedigree information and reducing the enterprise infrastructure required to maintain pedigree information.

In one example, a software application executing on client device 100 includes program code to view, generate, modify and/or delete local pedigree fragments in pedigree object 110, upon proper authentication of the user. For example, when a resource, e.g., image data 108, is inserted into document 102, program code executing on client device 100 generates local pedigree fragments that define the pedigree of image data 108. The software module may perform similar operations on other data of pedigree object 110 such as document pedigree control (DPC) 112 and pedigree cache control (PCC) 114. As illustrated in subsequent examples, a software module executing on client device 100 may also create and insert a pointer within pointers 118 for identifying a location of remote pedigree information for document 102. Pointers 118 references remote pedigree fragments (not shown) that define the pedigree of image data 108 and which are stored on a remote device and are further described in subsequent examples.

As shown in the example of FIG. 1, pedigree object 110 includes one or more pedigree object controls such as document pedigree control (DPC) 112 and pedigree cache control (PCC) 114. DPC 112, in some examples, is a data structure that occupies a first storage block of pedigree object 110 and includes data specifying access controls associated with document 102. As shown in FIG. 1, data specifying DPC 112 is stored in, e.g., block 120 of pedigree object 110. Access controls, in some examples, include data that define permissions such as whether a user is able to read, modify, and/or take other actions with a document. For example, DPC 112 includes access controls that specify a user may read document 102 but may not modify document 102. Access controls, in other examples, include data that specify the security classification of a document. For example, security classifications may include designations such as Top Secret, Secret, Confidential, Restricted, and Unclassified. DPC 112, in one example, may include a Top Secret designation that indicates information included in document 102 is highly sensitive.

In some examples, pedigree object 110 defines and stores a pedigree cache control (PCC) 114 in a second storage block of the pedigree object. In one example, PCC 114 includes data that identifies the contents of each subsequent storage block in pedigree object 110. Such data may be stored in, e.g., block 122, of pedigree object 110. Data identifying the contents of each block may be specified using a bitmask, identifier, map or other techniques. In one example, pedigree cache control stores data that defines a map that specifies whether each of the remaining blocks of pedigree object store local pedigree fragments (LPFs) or pointers to remote pedigree fragments. In this way, the contents of each block may be identified and selected by client device 100.

PCC 114, in some examples, includes data specifying access controls associated with a resource or pedigree fragment. Access controls, in some examples, include permission data that specifies whether a user is able to read, write, and/or remove a resource or pedigree fragment. For example, PCC 114 may include access controls that specify a user may read, write, and remove LPF 116A but may not modify image data 108 in any way. Access controls, in other examples, include data to classify the confidentiality of a resource or pedigree fragment. For example, a confidentiality classification system may include accessibility designations such as Top Secret, Secret, Confidential, Restricted, and Unclassified. PCC 114, in one example, may include data indicating a designation of Top Secret to indicate information included in image data 108 is highly sensitive.

In one example, the complete pedigree of a resource, e.g., image data 108, is stored in the form of local pedigree fragments in pedigree object 110. In some examples redundant copies of the pedigree fragments may also be stored on client device 100 and/or remotely at a pedigree management system. Thus, in one example, pointer 118A is a null value to indicate the complete pedigree of image data 108 is included in pedigree object 110. Initially, a user provides a user input to client device 100 to request pedigree information of image data 108. In response to receiving the request, a selection module (further described in FIG. 2), executing on client device 100, selects data included in PCC 114 to identify the blocks in pedigree object 110 that contain local pedigree fragments. For example PCC 114 may include a bitmask with a pattern of 1110 or 0111 to indicate that blocks 124, 126, 128 include local pedigree fragments, where a value of 1 indicates a local pedigree fragment and a value of 0 indicates a pointer. After identifying the blocks that contain local pedigree fragments using PCC 114, the selection module selects LPFs 116 from blocks 124, 126, 128 for assembly. The selection module further determines that pointer 118A is a null value and therefore LPFs 116A, 116B, through 116N comprise the complete pedigree of image data 108. LPFs 116 are then assembled and made available to the user for further processing and display.

In some examples, no fixed storage limit is specified by document 102 and/or pedigree object 110 to store pedigree information. In such examples, the entire pedigree of a resource may be stored in document 102. In other examples, however, document 102 allocates a fixed amount of storage space to store pedigree information. In one example, a fixed amount of storage space may be approximately one kilobyte. In this example, if the amount of pedigree information for resources of document 102 exceeds the storage space limit, the excess pedigree information may be stored remotely. In such examples, pointers 118 are stored locally in pedigree object 110, e.g., in blocks 130 through 132, to provide a compact mechanism for identifying remote pedigree fragments. Pointers 118 are identifiers that may be used to access excess remotely stored pedigree information. In some examples, excess pedigree information is stored in databases or other documents on client device 100. In other examples, excess pedigree information is stored in databases, other documents, or storage devices of a remote server. Pointers 118, in some examples, may be memory addresses, file names, uniform resource identifiers (URIs), hash codes or other data that identifies remotely stored pedigree information of a resource.

Figure 3:
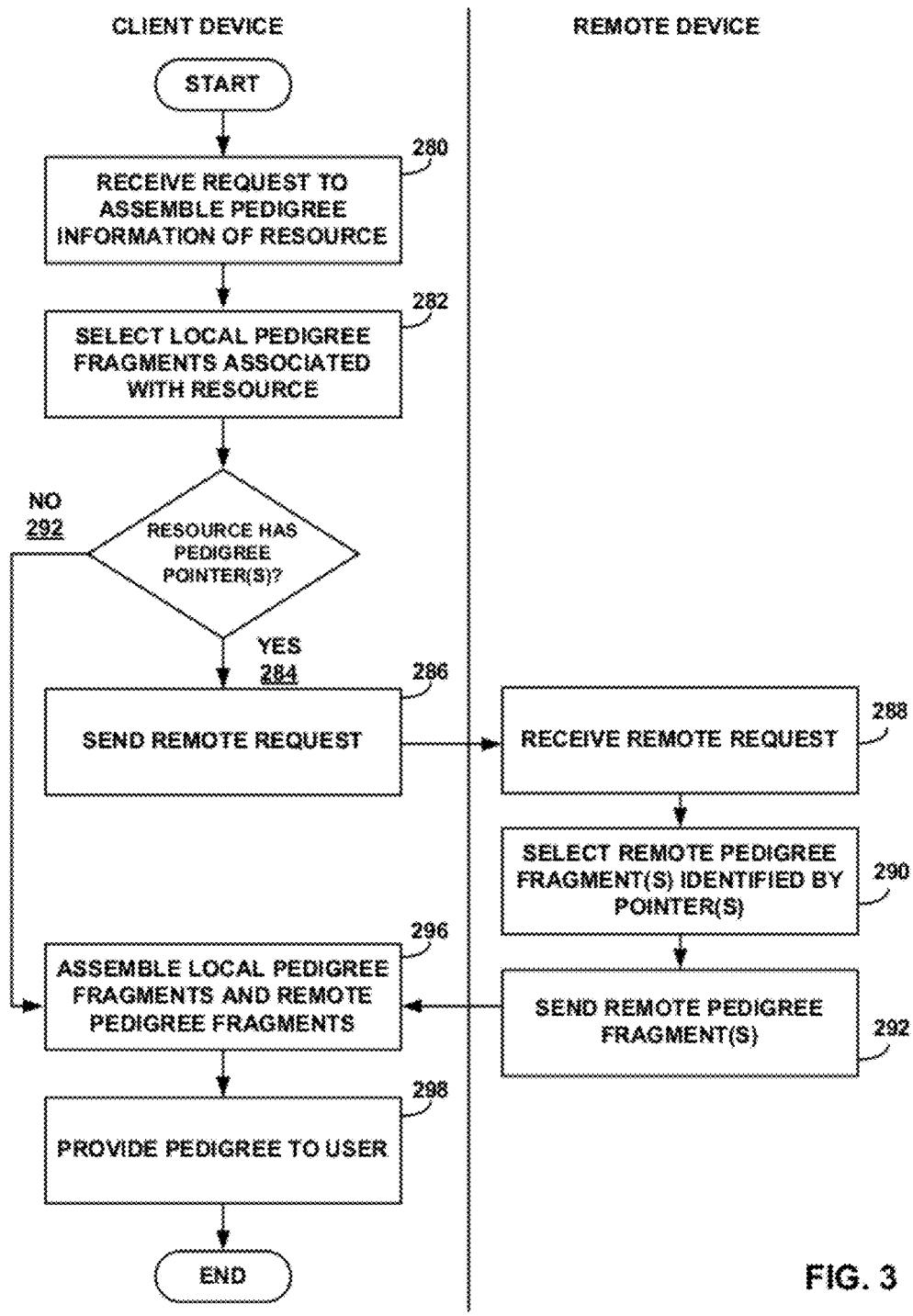
FIG. 3 is a flowchart illustrating an example method of a client device requesting remote pedigree fragments from a remote device.

In some examples, new local pedigree fragments may be added to pedigree object 110 as the pedigree of image data 108 grows. In these cases, the quantity of pedigree information of image data 108 exceeds the storage space available for pedigree information in document 102 and, therefore, the entire pedigree of image data 108 is therefore not stored locally in document 102. Consequently, LPFs 116 only partially specify the pedigree of image data 108 and the remainder of the pedigree information of image data 108 is stored remotely, i.e., external to document 102. Pointers 118, e.g., URIs, are used to identify and access the remotely stored pedigree information. For example, pointers 118 identifies remote pedigree fragments that may specifies a direct relationship between image data 108 and a resource from which image data 108 is derived, or an indirect relationship between image data 108 and a resource from which 108 is derived. FIG. 3 further describes the use of pointers in greater detail.

Various aspects of the disclosure may provide, in certain instances, one or more benefits and advantages. For example, storing pedigree information locally within a document may reduce or eliminate the requirement for centralized document tracking Eliminating the need for centralized document tracking lowers cost and complexity of managing pedigree information. Furthermore, retrieval of pedigree information may be faster because network access may not be required. Aspects of the disclosure also simplify document and pedigree information creation in situations where a centralized pedigree management server is deployed prior to generating pedigree information and as documents are created. Decentralizing pedigree management may also provide greater resilience to attacks on pedigree information because pedigree data is not stored in a single location.

Figure 2:
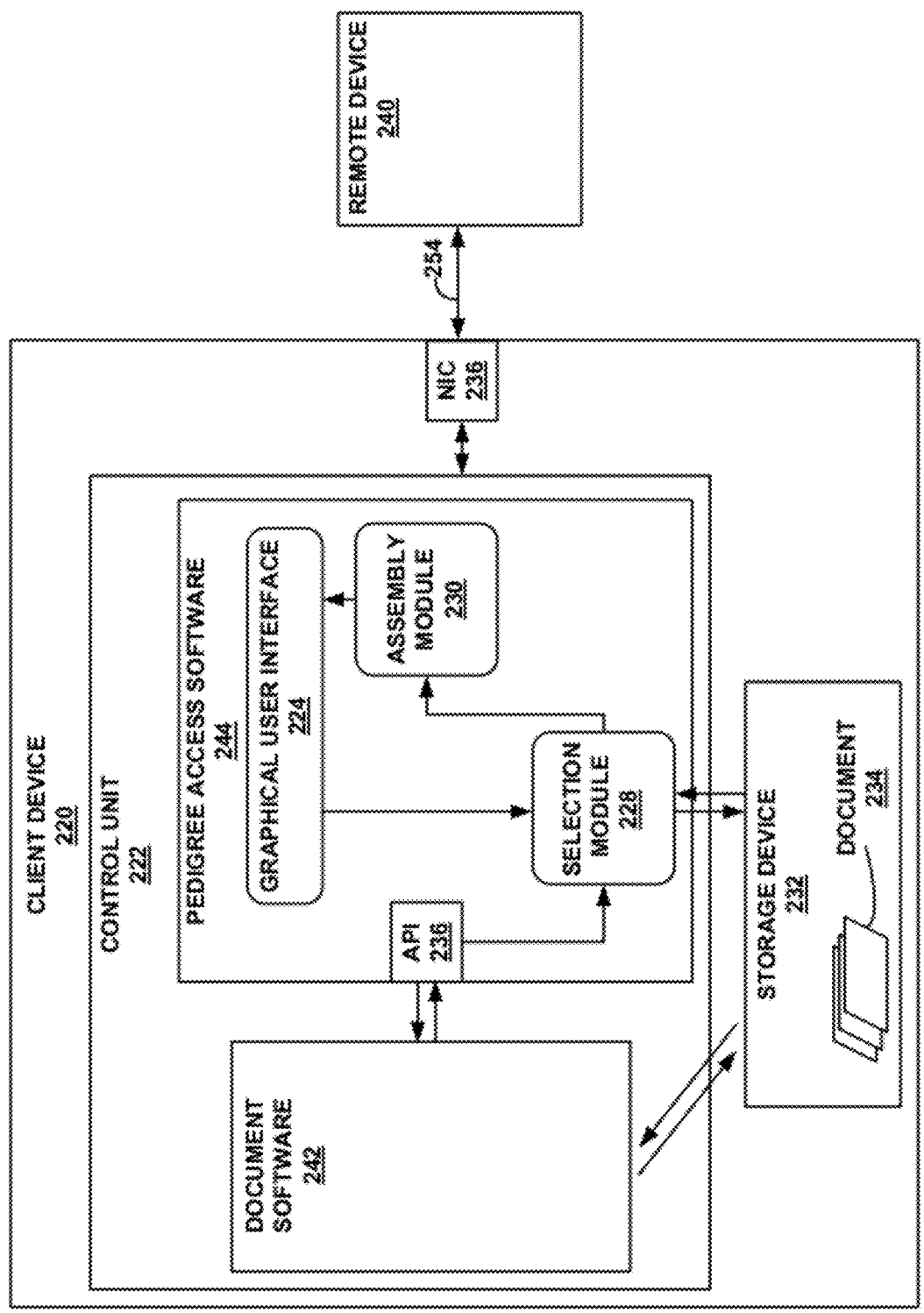
FIG. 2 is a block diagram further illustrating an example of a client device and a remote device implementing techniques of the present disclosure.

FIG. 2 is a block diagram further illustrating an example of a client device 220 that may implement the techniques described in this disclosure. Client device 220 connects to remote device 240 via network interface 236 using network elements 254. Client device 220 may be one of many different types of electronic devices. For example, client device 220 may be a personal computer, a laptop computer, a handheld computer, a "smart" mobile telephone, a server, a workstation or the like.

As shown in FIG. 2, client device 220 includes a control unit 222, network interface 236, and storage device 232. Control unit 222 provides an operating environment for an operating system and various software applications. In the example of FIG. 2, control unit 222 executes document software 242 and pedigree access software 244. As shown in FIG. 2 pedigree access software 244 includes a graphical user interface 224, selection module 228, and assembly module 230. In some examples, graphical user interface 224, selection module 228, and assembly module 230 include instructions executable by control unit 222. Pedigree access software 244 further provides an application programming interface (API) 236. API 236 provides an interface that enables software, e.g., document software 242, to access services provided by selection module 228.

Document software 242 may include any software for viewing and/or editing a document that includes a resource. Examples of document software 242 may include a word processor, photo or image editor, or web browser. Storage device 232 includes document 234. Document 234, in one example, includes document 102 as shown in FIG. 1. Network interface 236, in some examples, is a computer hardware component that interfaces to network elements 254. In some examples, network interface 236 is an Ethernet network interface card or 3G wireless radio.

As shown in FIG. 2, control unit 222 of client device 220 provides an operating environment for graphical user interface 224, selection module 228, and assembly module 230. A user interacts with graphical user interface (GUI) 224 to access and modify content such as pedigree information, documents, and resources. GUI 224 includes any number of graphical control elements such as text boxes, control buttons, scroll bars, etc., that enable a user to modify and interact with content. In addition, GUI 224 displays content such as pedigree information, documents, and resources. In one example, a user selects a graphical control element of GUI 224, e.g., a button, using an input device such as mouse pointing device to request the pedigree of a resource.

As shown in FIG. 2, GUI 224 receives user input data provided through graphical user interface 224. For example, when a user requests the pedigree of a resource, GUI 224 receives the request in the form of user input data that specifies the requested pedigree information. GUI 224, in some examples, performs processing of the user input data to prepare the data for further processing by selection module 228. For example, GUI 224 may verify the user input data against a set of predefined rules and/or format the user input data in preparation for processing by selection module 228. In some examples, if user input data is invalid, GUI 224 notifies the user and re-requests valid user input.

As shown in FIG. 2 selection module 228 executing on client device 220 receives user input data that specifies a request for pedigree information from GUI 224. In one example, the user input data includes a resource identifier that identifies the resource for which pedigree information is requested. The user input data further includes a document identifier of document 234, which contains the identified resource. A resource identifier and/or document identifier may be a hash code, file name, resource name, or any other information that may uniquely identify a resource or document. Using the document identifier, selection module 228 selects document 234.

In some cases, the user may simply identify the document of interest, i.e., document 234, by browsing the file directory and selecting the document. In other cases, pedigree access software 244 may be integrated with or directly accessible by document software 242. For example, a user may interact with a word processing application to view a word processing document and, when desired, invoke pedigree access software 244 in a seamless manner to view the pedigree information for the current word processing document. In such cases, user interface controls for viewing the pedigree information may be integrated into one or more of document software 242 such that the user can easily request the pedigree information for the current document being processed. In response, the executing document software 242 may invoke pedigree access software 244 by way of API 236 and, in some cases, may pass pedigree object 110 (FIG. 1) from the current document to the pedigree access software as a parameter for processing and display of the pedigree information. Pedigree access software 244 may take the form of a separately executable software application or a modular component, such as a Java plug-in, a dynamic link library (DLL), or an ActiveX container.

In any case, after selecting document 234, selection module 228 selects pedigree information associated with the resource using the resource identifier. In one example, selection module 228 selects a pedigree object associated with the resource from document 234. Selection module 228 analyzes the pedigree cache control of the pedigree object to identify the blocks of the pedigree object that contain local pedigree fragments. If the complete pedigree of the resource is stored locally in document 234, e.g., as local pedigree fragments, selection module 228 selects the local pedigree fragments and provides the selected fragments to assembly module 230. Assembly module 230 executing on client device 220 assembles the local pedigree fragments and provides the assembled pedigree of the resource to the user for display and further processing.

In some examples, the complete pedigree of a selected resource may not be stored locally in document 234. In such examples, the pedigree object associated with the selected resource includes one or more pointers (e.g., pointer 118, as shown in FIG. 1) that identify remote pedigree information stored on remote device 240. To request the remote pedigree information, selection module 228 generates a remote request based on the one or more pointers. The remote request, in some examples, specifies a quantity of requested pedigree information. A quantity of requested pedigree information may indicate that all pedigree information of a resource is requested, or alternatively, only a partial quantity of pedigree information is requested. In one example, selection module 228 generates a remote request that indicates the entire pedigree is requested. Furthermore, the pointer included in the pedigree object of document 234 may be a URI that identifies pedigree information stored on remote device 240. For example, the URI may refer to remote pedigree fragments (not shown) stored in a pedigree database of remote device 240. The generated remote request is sent via network interface 236 to remote device 240.

Using techniques further described hereinafter, remote device 240 receives the generated remote request and selects the requested remote pedigree information. The selected remote pedigree information is then sent by remote device 240 to client device 220. Selection module 228 of client device 220 receives the remotely-stored pedigree information, which is then provided to assembly module 230 for assembly and further processing as described above.

In one example, remote device 240 may be a component of a pedigree management system. For example, remote device 240 may be a component of a backend pedigree management system. One example of a pedigree management system is described in U.S. patent application Ser. No. 11/943,374, filed Nov. 20, 2007, the entire contents of which are incorporated by reference herein. Thus, in one example, remote device 240 may receive a request for pedigree data of a resource from client device 220. Remote device 240 may, in response to one or more requests from client device 220 retrieve and send the requested pedigree data to client device 220. Selection module 228 of pedigree access software 244 may receive the requested pedigree data and subsequently send it to assembly module 230 for assembly.

In another example, remote device 240 may be a second client device, i.e., a peer device, that includes features and characteristics similar to client device 220. For example, remote device 240 may include a control unit executing pedigree management software and may further include a storage device that stores documents. In this case, local documents stored on the peer device (i.e., remote device 240) may include the additional remote pedigree data requested by client device 220. In such examples, pedigree data may be stored in documents distributed on numerous peer devices in a decentralized architecture. Details of this decentralized implementation are further described in greater detail in FIG. 5.

In one embodiment, the request issued by client device 220 to remote device 240 includes data, e.g., a unique character string, which directly identifies a remote pedigree fragment included in a document that is stored on remote device 240. In such examples, remote device 240 selects the remote pedigree fragment from the document based on the data included in the remote request that directly identifies the remote pedigree fragment. In some examples, after remote device 240 has selected one or more remote pedigree fragments, remote device 240 sends the selected remote pedigree fragments to client device 220.

Control unit 222, in some examples, includes one or more processors (not shown) that execute software instructions, such as those used to define a software or computer program, stored to a computer-readable storage medium. Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 222 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Control unit 222, in some examples, communicates with network interface 236 and storage device 232.

FIG. 3 is a flowchart illustrating an example method of a client device requesting remote pedigree fragments from a remote device in accordance with the techniques of this disclosure. Example techniques of the present disclosure, e.g., the example techniques disclosed in FIGS. 1 and 2, may be adapted to enable a client device to request remote pedigree fragments from a remote device. For example, the method illustrated in FIG. 3 may be performed by client device 220, remote device 240, and network elements 254 as shown in FIG. 2.

In the example method shown in FIG. 3, the client device initially receives a user input that requests pedigree information of a resource included in a document, such as specific text-based assertion within the document or an image (280). In one example, the user selects the resource and further requests the complete pedigree of the text block using a graphical user interface provided by the pedigree access software 224 executing on the client device. Alternatively, as explained above, the user may request the pedigree information by invoking a user-interface control provided by document software 242. In some embodiments, the user may simply request the pedigree information associated with a document without specifying a particular resource within the document. In any case, for purpose of simplicity with respect to describing the flowchart of FIG. 3, it is assumed that the document of interest includes both local pedigree fragments associated with the text block and a pointer to remote pedigree fragments associated with the text block. Consequently, some of the text block pedigree information is stored locally in the pedigree object of the document on the client device and some of the text block pedigree information is stored on a remote device.

As shown in FIG. 3, the client device selects the local pedigree fragments associated with the text block from the pedigree object (282). Additionally, the client device selects the pointer associated with the text block from the pedigree object (284). Using the selected pointer, the client device generates a remote request that is sent to the remote device (286). In the current example, the pointer is a Universal Resource Locator (URL). The URL includes the location of the pedigree information stored on the remote device. In the current example, the client device generates a remote request that includes data identifying the pedigree information stored on the remote device and data that specifies a request for the complete pedigree of the resource. The client device sends the generated remote request to the remote device.

As shown in FIG. 3, the remote device initially receives the remote request (288). The remote device determines that the remote request includes a request for the complete pedigree of the text block. The remote device further determines, based on the remote request, which remote pedigree fragments are requested. Using this information, the remote device selects each remote pedigree fragment stored on the remote device that is required to produce the complete pedigree of the text block (290). After selecting all required pedigree fragments, the remote device sends the remote pedigree fragments to the client device (292).

As shown in FIG. 3, after receiving the remote pedigree fragments from the remote device, the client device assembles the local pedigree fragments and the remote pedigree fragments to produce a complete pedigree of the text block (296). The complete pedigree of the text block is then provided to the user for display and further processing (298).

FIG. 4 is a block diagram illustrating a document 334 that includes restricted pedigree information stored in a pedigree object 322, in accordance with one or more aspects of the present disclosure. As shown in FIG. 4, document 334 is stored on client device 320 and further includes metadata 336, text 340, and image 342. As shown in FIG. 4, metadata 336 includes pedigree object 322. Pedigree object 322 includes document pedigree control (DPC) 324, pedigree cache control (PCC) 326, restricted local pedigree fragment (RLPF) 330, and restricted pointer 332. As shown in FIG. 4, client device 320 communicates with remote device 348 via a network 344. Remote device 348 further includes restricted remote pedigree fragment 352. In one example, remote pedigree fragment 352 may be stored in a database 350 executing on remote device 348. Elements of FIG. 4 contain the same properties and characteristics of elements described in FIGS. 1 and 2 unless otherwise described hereinafter.

In some examples, it may be desirable to restrict access to pedigree information that is locally stored in document 334. For example, a source of pedigree information of text 340 may be classified, and therefore it may be desirable to restrict access to the pedigree information included in metadata 336. As shown in FIG. 4, pedigree object 322 is included in metadata 336 and further includes restricted local pedigree fragment (RLPF) 330 and restricted pointer 332. RLPF 330 contains properties and characteristics similar to a pedigree fragment as previously described herein; however, RLPF 330 is further encrypted to restrict access to the data that comprises RLPF 330. Similarly, restricted pointer 332 contains properties and characteristics similar to a pointer as previously described herein; however, access to data referenced by pointer 332 is restricted on remote device 348.

In some examples, an unauthorized individual seeking to read a pedigree may determine that a quantity of pedigree stored in a pedigree object or a size of a pedigree object is proportional to an amount pedigree information is stored in the pedigree object. The unauthorized individual may therefore attempt to obtain and access pedigree objects that include larger quantities of information. Consequently, one or more obfuscation techniques may be applied to the pedigree information stored in the pedigree object to modify the size of the pedigree object. For example, prior to encrypting the pedigree information of a RLPF, "fake" or "decoy" pedigree fragments may be generated and included in the pedigree object together with the actual pedigree that is stored in the pedigree fragments. Fake pedigree fragments may comprise randomly generated data in some examples. After fake pedigree fragments and pedigree fragments that store actual pedigree have been included in the pedigree object, the pedigree fragments may be encrypted to generate RLPFs. In this way, obfuscation techniques may modify the size of the pedigree object and the corresponding quantity of pedigree information such that the size of each pedigree object appears the same.

In one example, public-key cryptography techniques are used to restrict access to pedigree information in document 334. For example, an original author of text 340 initially generates local pedigree fragments that define a pedigree of text 340. The original author further determines that access to the pedigree data should be restricted. To restrict access, the original author encrypts the local pedigree fragment using a public key, which generates restricted local pedigree fragment 330. The public key used by the author may be designated for use to encrypt any Top Secret pedigree information and the corresponding private key may be stored on remote device 348. In other examples, an author may have his/her own key pair. A Top Secret classification of pedigree information may indicate, for example, a highest classification of information that requires a highest level of information security. In the encryption process, data indicating the security classification of pedigree object 322, e.g., "Top Secret", is stored in DPC 324. In addition to storing the private key, remote device 348 further includes data security policies that manage access to pedigree data in pedigree objects based on the security classifications. In one example, a data security policy may include an access control list specifying a list of permissions associated with a security classification. For example, an access control list may specify one or more users or groups that are authorized to view pedigree information having a Top Secret security classification.

In the current example, a subsequent user with sufficient authority to view Top Secret pedigree information provides a user input to client device 320 to view pedigree data in RLPF 330. To decrypt RLPF 330, the authorized user sends pedigree object 322 to remote device 348 with credentials, e.g., a username and password, to authenticate the authorized user. Remote device 348 analyzes the security classification specified in DPC 324 to determine that pedigree data of RLPF 330 is classified as Top Secret. Remote device 348 then determines, based on the credentials that authenticate the authorized user and the data security policy for Top Secret pedigree information that the authorized user has authority to access pedigree data in RLPF 330. Because the authorized user has authority to view pedigree data in pedigree object 332, remote device 348 decrypts RLPF 330 using the private key to decrypt Top Secret pedigree data. The decrypted data of RLPF 330 is then sent to client device 320. The example technique may further be executed using, e.g., Secure Socket Layer tunneling, to ensure secure data transmission over network 344 between client device 320 and remote device 348. The example technique may further be executed using one or more shared symmetric keys. In such examples, client device 320, using a symmetric key for Top Secret data, may decrypt RLPF 330 without requiring access to remote device 348. In still other examples, access to the document provides access to all pedigree information. This approach provides less granular access control to individual pedigree objects but greater simplicity in implementation.

Restricted access techniques may also be used for restricted pointer 332, as shown in FIG. 4. In some examples, the quantity of pedigree information exceeds the amount of space available to store local pedigree information in pedigree object 322. Consequently, some pedigree information is locally stored in pedigree object 322 and the remaining pedigree information is stored on remote device 348. Furthermore, a user may wish to restrict access to the pedigree information. To restrict access, the local pedigree information and remote pedigree information are each encrypted. For example, as shown in FIG. 4, local pedigree information is encrypted and stored in pedigree object 322 as RLPF 330. Restricted pointer 332 points to restricted remote pedigree fragment (RRPF) 352 stored on remote device 348. RRPF 352 is similar to a remote pedigree fragment as previously described, but access to RRPF 352 is restricted to authorized users and systems. As shown in FIG. 4, RRPF 352 is only accessible to users or systems that present sufficient authorization credentials.

In one example of a technique using restricted pointer 332, an authorized user with sufficient authority to view pedigree information in pedigree object 322 provides a user input to client device 320 to request the complete pedigree of text 340. Pedigree object 322 includes pedigree information of text 340, and the pedigree information of text 340 is further classified as "Secret". As shown in FIG. 4, part of the pedigree information of text 340 is stored locally in pedigree object 322. The remainder of the pedigree information is stored on remote device 348 as RRPF 352 and may be accessed using restricted pointer 332.

To obtain the complete pedigree of text 340, the authorized user sends pedigree object 322 to remote device 348 with credentials to authenticate the authorized user. Remote device 348 analyzes the security classification specified in DPC 324 to determine that pedigree data of RLPF 330 and RRPF 352 is classified as Secret. Remote device 348 then determines, based on the credentials which authenticate the authorized user and the data security policy for Secret pedigree information that the authorized user has authority to access pedigree data in RLPF 330 and RRPF 352. Because the authorized user has authority to view pedigree data in pedigree object 332, remote device 348 decrypts RLPF 330 using the private key to decrypt Secret pedigree data. In addition, remote device 348 retrieves RRPF 352. The decrypted data of RLPF 330 and RRPF 352 are then sent to client device 320. The example technique may further be executed using, e.g., Secure Socket Layer tunneling, to ensure secure data transmission over network 344 between client device 320 and remote device 348.

In some examples, techniques of the present disclosure may be adapted to restrict access to pedigree information in pedigree object 322 according to trusted or untrusted domains. In one example, a domain is a logical grouping of users subject to one or more common policies, e.g., security policies. In other examples, a domain is a logical grouping of networked computing devices subject to one or more common policies. In some examples, a domain may further be designated as trusted or untrusted. A recipient in a trusted domain may access a service provided by a server device also in the trusted domain. In contrast, a recipient in an untrusted domain may not access a service provided by the server device in the trusted domain. In some examples, a recipient may be a user or computing device.

The concept of trusted and untrusted domains may be used to restrict access to pedigree information stored in document 334. In one example, client device 320, as shown in FIG. 4, is a part of a trusted domain. A module executing on client device 320 includes or has network access to a list of trusted and untrusted domains. Furthermore, a security policy associated with the trusted domain of client 320 may specify that local pedigree fragments of pedigree object 322 must be encrypted by client 320 as restricted local pedigree fragments when document 334 is transferred to a recipient in an untrusted domain.

In another example, a security policy associated with the trusted domain of client 320 may specify that local pedigree fragments of pedigree object 322 must be removed by client 320 and replaced with restricted pointer 332 before being transferred to an untrusted domain. The local pedigree fragments removed from pedigree object 322 are stored in remote device 348 as RRPF 352 and are accessible by restricted pointer 332. Using aforementioned techniques, pedigree data of RRPF 352 may only be accessed using restricted pointer 332 by users or systems with sufficient authority. In this way, pedigree data of pedigree object 322 may be encrypted or removed entirely from document 334 when pedigree information of document 334 is transferred to an untrusted domain. Techniques to encrypt or remove local pedigree fragments from pedigree objects based on domains may be performed by a module executing on client device 320 automatically or in response to a user input. In either example, the module receives data that instructs client device 320 to transfer document 334 to an untrusted domain.

Figure 5:
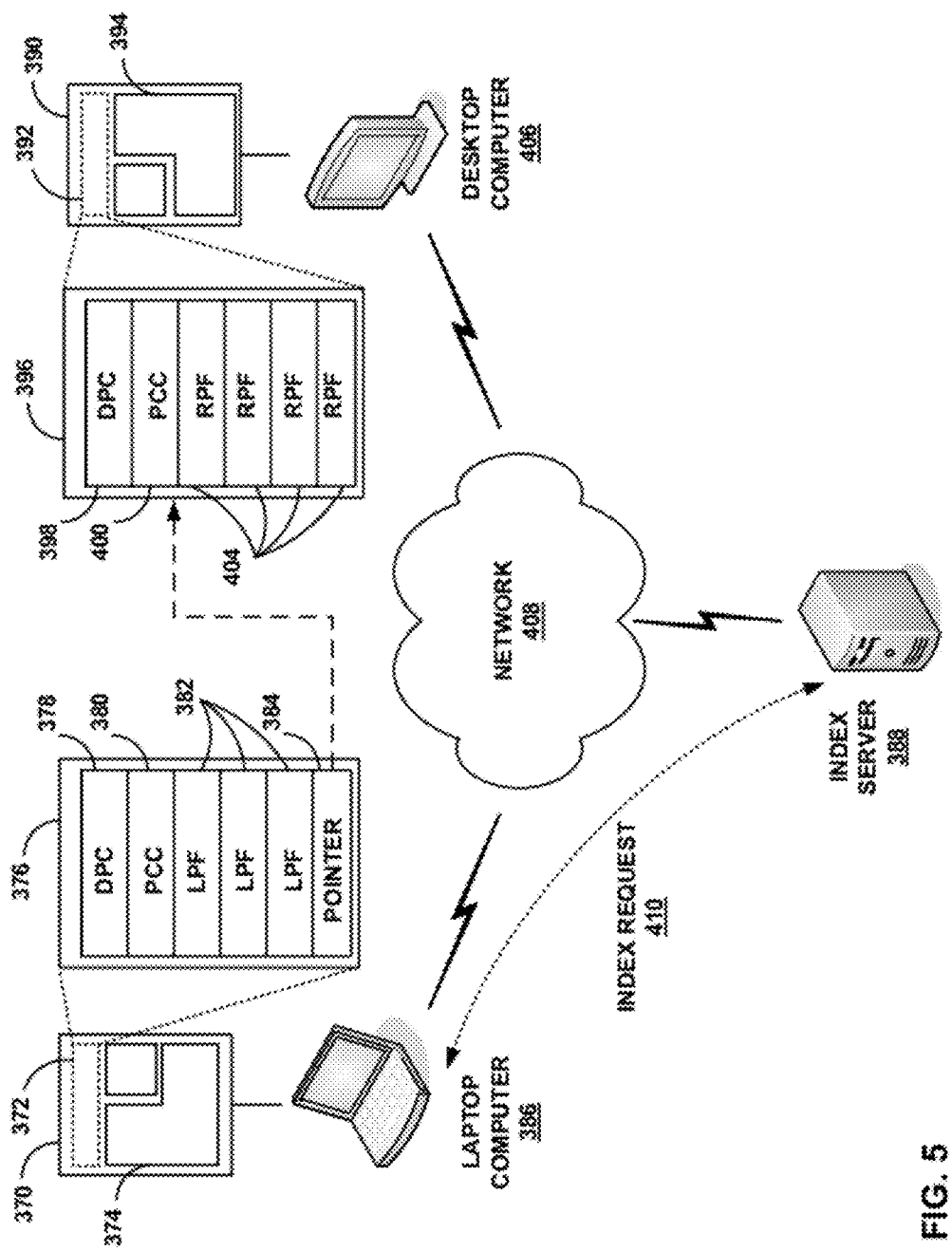
FIG. 5 is a block diagram illustrating techniques for locally storing authoritative pedigree information in documents.

FIG. 5 is a block diagram illustrating techniques for locally storing authoritative pedigree information in documents, in accordance with one or more aspects of the present invention. In some examples, it may be advantageous to store the authoritative source of pedigree information in documents distributed on multiple client devices rather than in a centralized location, e.g., a pedigree management server. This decentralized approach has numerous advantages including eliminating the requirement for centralized document tracking, which lowers the cost and complexity of managing pedigree information. Furthermore, retrieval of pedigree information may be quicker because network access is not required. In addition, because network access is not required, the reliability of pedigree information retrieval is improved.

As shown in FIG. 5, laptop computer 386 includes document 370. Document 370 further includes text 374 and metadata 372. Metadata 372 includes pedigree object 376, and pedigree object 376 includes document pedigree control (DPC) 378, pedigree cache control (PCC) 380, lightweight pedigree fragments (LPF) 382, and pointer (384). Laptop computer 386 further communicates with desktop computer 406 and index server 388 via network 408.

As shown in FIG. 5, desktop computer 406 includes document 390. Document 390 further includes text 394 and metadata 392. Metadata 392 includes pedigree object 396, and pedigree object 396 further includes document pedigree control (DPC) 398, pedigree cache control (PCC) 400, and remote pedigree fragments (RPF) 404. Desktop computer 406 further communicates with laptop computer 386 and index server 388 via network 408. Elements of FIG. 5 contain the same properties and characteristics of elements described in FIGS. 1-4 unless otherwise described hereinafter.

As shown in FIG. 5, the authoritative copy of pedigree information of text 374 is stored in document 370 and document 390 as LPFs 382 and RPFs 404, respectively. Thus, because the pedigree information is stored in documents, no central pedigree management server is required to store pedigree information. As shown in FIG. 5, pedigree object 376 includes local pedigree fragments 382 that define part of the pedigree of text 374. Pointer 384 points to pedigree object 396, which includes the remainder of the pedigree information of text 374. The remainder of the pedigree information is stored as remote pedigree fragments 404.

In distributed pedigree configurations, e.g., as shown in FIG. 5, each document is uniquely identifiable. Uniquely identifiable documents enable retrieval of pedigree information when pedigree data is stored in multiple documents. In one example, each document is assigned a remote identifier such as a unique hash code based on its content. The remote identifier is independent of a document's file name and therefore may identify a document even when the document file name or location changes, or multiple documents have the same file name. In one example, the unique hash code of document 376 is stored in DPC 378.

In some examples, an index or map data structure that includes hash code-to-location mappings is stored on index server 388. In one example, the index includes associations of unique remote identifiers, e.g., hash codes, of documents with location identifiers, e.g., URLs that identify the respective locations of the documents. The index stored on index server 388 is accessible to laptop computer 386 and desktop computer 406 via network 408. In some examples, the index or map data structure is stored on each of laptop computer 386 and desktop 406 as peer distributed indices. The index or map data structure may be updated, e.g., as new pedigree information is generated by a client device or when URLs associated with hash codes change. In some examples, greater granularity is achieved by assigning a hash code to each resource within a document. The resource hash code is associated with a URL that identifies the location of the resource. In one example, such a hash code may be stored in DPC 378.

As shown in FIG. 5, a user of laptop computer 386, in one example, requests the complete pedigree of text 374. Part of the pedigree of text 374 is stored as LPFs 382 and the remainder of the pedigree is stored as RPFs 404 on desktop computer 406. In response to user input indicating the request, a module executing on laptop computer 386 initially selects LPFs 382 and pointer 384. In the example of FIG. 5, pointer 384 is a hash code that identifies text 394, i.e., a resource, of document 390. In the current example, the requested pedigree information of text 394 is included in pedigree object 396. To identify the location of text 394, a module executing on laptop computer 386 generates an index request 410 that includes the hash code identifying text 394. Index request 410 is sent to index server 388, which includes an index of hash code-to location mappings. Index server 388 retrieves a URL that identifies the location of resource 394. Index server 388 sends the URL associated with the hash code of resource 394 to laptop computer 386.

Upon receiving the URL from index server 388, laptop computer 386 generates a remote request including data that requests RPFs 404 from desktop computer 406. The remote request is sent to desktop computer 406 based on the URL received from index server 388. Desktop computer 406 includes a module that receives the remote request and selects RPFs 404. RPFs 404 are then sent to laptop computer 386 for assembly with LPFs 382. In this way the complete pedigree of text 374 may be generated for the user of laptop computer 386.

The following is one, non-limiting example of a document structure that includes local pedigree data:

```
<?xml version="1.0" encoding="UTF-8" standalone="yes"?>
<?mso-application progid="Word.Document"?>
<w:wordDocument
 xmlns:w="http://schemas.microsoft.com/office/word/2003/wordml"
 xmlns:o="urn:schemas-microsoft-com:office:office"
 xmlns:ped="http://atc-nycorp.com/pedigree/2011-02-14"
 xmlns:dc="http://purl.org/dc/elements/1.1/">
  <o:DocumentProperties>
    <o:Title>DYNAMIC ASSEMBLY OF INFORMATION
```

-continued

```
    PEDIGREES </o:Title>
    <o:Author>Patent Counsel</o:Author>
  </o:DocumentProperties>
  <ped:PedigreeObject id="1234">
    <ped:DocumentPedigreeControl>
    </ped:DocumentPedigreeControl>
    <ped:PedigreeCacheControl>
      <!-- '1'=local pedigree fragment, '0'=pointer -->
      <ped:blockContents>110</ped:blockContents>
    </ped:PedigreeCacheControl>
    <!-- Local pedigree data -->
    <ped:pedigree>
      <!-- resource id=1234 is derived from
           http://www.example.com/testdoc.txt?pedigree#resourceId=
           5678
        -->
      <ped:block id="0" about="#resourceId=1234" pred="dc:source">
           http://www.example.com/testdoc.-
           txt?pedigree#resourceId=5678
      </ped:block>
      <!-- http://www.example.com/...resourceId=5678 is derived from
           http://www.example2.com/...resourceId=1234 -->
      <ped:block id="1"
about="http://www.example.com/testdoc.txt#resourceId=5678"
pred="dc:source">
           http://www.example2.com/pedigree?md5=
           73cfa4784cb55bc605c9483fd
           8b9a37d;resourceId=1234
      </ped:block>
      <!-- pointer to pedigree management server that contains remainder
           of pedigree for resourceId=1234 -->
      <ped:block id="2" about="resourceId=1234">
           http://server/path/to/PedigreeManagmentServer#resourceId=
           1234
      </ped:block>
    </ped:pedigree>
  </ped:PedigreeObject>
  <w:body>
    <!-- Document Text -->
    <w:t resource="1234">
      This is example text of the document.
    </w:t>
  </w:body>
</w:wordDocument>
```

Multiple-level lookups are also possible in a decentralized approach to pedigree management. In one example, pedigree object 396 may not store an entire pedigree. Instead, pedigree object 396 stores RPFs 404 that comprise part of the pedigree and a pointer, e.g., a hash code, of a third resource (not shown) that is stored in another document on separate computing device that includes the remainder of the pedigree. In such examples, desktop computer 406, in response to receiving the remote request from laptop computer 386, sends RPFs 404 and the pointer to the third resource back to laptop computer 386. Laptop computer 386 generates an index request that includes the hash code of the pointer to the third resource and sends the index request to index server 388. Index server 388 selects the URL corresponding to the hash code of the third resource and sends the URL to laptop computer 386. Laptop computer 386 uses the URL to retrieve pedigree information associated with the third resource, which is ultimately used to generate the complete pedigree of text 374. This process may be repeated until all requested pedigree information of text 374 has been retrieved by laptop computer 386. In this way, pedigree information distributed in many documents on numerous devices may be retrieved by laptop computer 386. In some examples, a peer distributed index stored on laptop computer 386 may be used to store the hash code/URL mappings thereby eliminating the need for index server 388.

Techniques of the present disclosure may also be adapted to identify progeny of a resource, e.g., text 394. In one example, progeny of text 394 may refer to resources that are "derived from" text 394. As shown in FIG. 5, text 374 is derived from text 394, and therefore is part of the progeny of text 394. To identify the progeny of a resource, index server 388 may store an association of a first resource hash code, a second resource hash code, and a URL of the second resource. In one example, the first resource hash code may correspond to text 394 and the second resource hash code may correspond to text 374. Furthermore, the URL of the second resource may identify the location of text 374. When pointer 384 is initially generated and stored in pedigree object 376, an association between the hash code of text 374 and the hash code of text 394 is stored in index server 388. The URL of text 374 is further included in the association of the text 374 hash code and the text 394 hash code. In this way, text 374, i.e., progeny of text 394, may be identified.

To identify the progeny of text 394, a user of desktop computer 406 initially provides a user input to request the progeny of text 394. A module executing on desktop computer 406 selects the hash code of text 394 from DPC 398. Desktop computer 406 sends the hash code to index server 388 with data requesting the progeny of text 394. Index server 388 queries its own set of stored associations using the hash code of text 394. The query performed by index server 388 identifies an association that includes the hash code of text 394, the hash code of text 374 and the URL of text 374. Because the URL specifies the location of text 374, index server 388 can further identify the document that includes text 374. Using this lookup process, index server 388 may identify each document that includes a pointer to document 390. In one example, the URLs for the group of documents that include pointers to document 390 comprise the progeny of text 394 and may be sent by index server 388 to desktop computer 406.

The functions described in this disclosure may be applied to information stored and/or retrieved using data storage media or communicated, e.g., transmitted and/or received, via a wired or wireless communication system. Examples of wired and wireless communication systems include any communication techniques including without limitation wireless transmission using CDMA, GSM, 802.11, Bluetooth, ultra wide band (UWB), OFDM, FDMA, TDMA, W-CDMA, or any other radio access techniques or technologies, and wired or wireless transmission using any of a variety of network protocols such as TCP/IP, ATM, or the like. The functions may be applied to any type of data including but not limited to music data, video data, multimedia data, or other entertainment data, financial data, security data, business data, government data, military data, marketing data, sales data, medical patient data, medical diagnostic data, medical imaging data, data representing graphical or textual content, image data, chemical data, geographic data, mapping data, television broadcast data, radio broadcast data, email data, Internet data, personal data, or the like.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various embodiments of the invention have been described. These and other embodiments are within the scope of the following claims.

The invention claimed is:

1. A method comprising:
receiving, by a computing device, a request to assemble a pedigree that describes a history of origin of a primary resource, the primary resource included in a document, wherein the requested pedigree of the primary resource represents the history as a set of statements that describe relationships between the primary resource and a plurality of other resources from which an asserted fact of the primary resource was derived;
selecting, by the computing device, a local pedigree fragment included in the document, the local pedigree fragment specifying a first direct relationship between the primary resource and a first resource of the plurality of other resources, wherein the first direct relationship indicates that the asserted fact of the primary resource was derived from data of the first resource; and
assembling, with the computing device, the pedigree of the primary resource from the local pedigree fragment.

2. The method of claim 1, wherein the request to assemble the pedigree further comprises a resource identifier, wherein the primary resource is identified by the resource identifier, and wherein the computing device selects the local pedigree fragment based on the resource identifier.

3. The method of claim 1, wherein the document further comprises a pedigree object, and wherein the pedigree object further includes the local pedigree fragment and a pedigree object control.

4. The method of claim 3, wherein selecting, by the computing device, a local pedigree fragment included in the document further comprises:
selecting, by the computing device, data from the pedigree object control that identifies a storage location of the local pedigree fragment in the pedigree object; and
selecting, by the computing device, the local pedigree fragment from the storage location based on the data from the pedigree object control.

5. The method of claim 3, comprising:
generating, by the computing device, a second local pedigree fragment in response to growth of the pedigree of the primary resource;
storing, by the computing device, the second local pedigree fragment in the pedigree object; and,
updating, by the computing device, data of the pedigree object control to indicate the storage location of the second local pedigree fragment in the pedigree object.

6. The method of claim 1, wherein the document further comprises a restricted local pedigree fragment, the restricted local pedigree fragment further comprising encrypted data, and wherein the method of claim 1 further comprises:

selecting, by the computing device, the restricted local pedigree fragment;
determining, by the computing device, the restricted local pedigree fragment includes encrypted data; and
decrypting, by the computing device, the restricted local pedigree fragment.

7. The method of claim 6, wherein decrypting the restricted local pedigree fragment comprises:
sending, by the computing device, the restricted local pedigree fragment and one or more authorization credentials to a remote device that decrypts the restricted local pedigree fragment based on the authorization credentials; and
receiving, by the computing device and from the remote device, decrypted data of the restricted local pedigree fragment.

8. The method of claim 6, wherein decrypting the restricted local pedigree fragment comprises:
determining, by the computing device, a decryption operation, wherein the decryption operation decrypts the encrypted data of the restricted local pedigree fragment based on a key.

9. The method of claim 1, further comprising:
receiving, by the computing device, data that instructs the computing device to send the document to a recipient in an untrusted domain;
applying, by the computing device, an encryption operation to encrypt the local pedigree fragment included in the document; and
sending, by the computing device, the document to the recipient in the untrusted domain.

10. The method of claim 1, further comprising:
receiving, by the computing device, data that instructs the computing device to send the document to a recipient in an untrusted domain;
removing, by the computing device, the local pedigree fragment from the document;
sending, by the computing device, the local pedigree fragment to a remote device that stores the local pedigree fragment, wherein the local pedigree fragment stored on the remote device is accessible only with sufficient authorization credentials;
generating, by the computing device, a pointer that identifies the local pedigree fragment stored on the remote device;
storing, by the computing device, the pointer in the document; and
sending, by the computing device, the document to the recipient in the untrusted domain.

11. The method of claim 1, comprising:
selecting, by the computing device, a pointer included in the document that identifies a first remote pedigree fragment not included in the document and stored on a remote device, the first remote pedigree fragment specifying a second direct relationship between the first resource and a second resource of the plurality of other resources, wherein the second direct relationship indicates that the first resource was derived from the second resource; and
sending, by the computing device, a remote request based on the pointer to the remote device to request the first remote pedigree fragment; and
receiving, by the computing device and from the remote device, the first remote pedigree fragment.

12. The method of claim 11, wherein the pointer further comprises data to identify the first remote pedigree fragment stored on a remote device, the pointer further comprising a memory address, file name, uniform resource identifier, or hash code.

13. The method of claim 11, wherein assembling, with the computing device, the pedigree of the primary resource further comprises assembling the pedigree of the primary resource from the first remote pedigree fragment.

14. The method of claim 11, wherein the document further comprises a pedigree object, and wherein the pedigree object further includes the local pedigree fragment, a pedigree object control, and the pointer.

15. The method of claim 11, comprising:
    selecting, by the computing device, a second pointer included in the document that identifies a second remote pedigree fragment not included in the document and stored on a remote device, the second remote pedigree fragment specifying an indirect relationship between the primary resource and a third resource of the plurality of other resources, wherein the indirect relationship indicates that the primary resource was derived from the third resource;
    sending, by the computing device, a remote request based on the second pointer to the remote device to request the second remote pedigree fragment; and
    receiving, by the computing device and from the remote device, the second remote pedigree fragment.

16. The method of claim 13, further comprising:
    generating, by the computing device, a third local pedigree fragment in response to growth of the pedigree of the primary resource;
    sending, by the computing device, the third local pedigree fragment to a remote device, wherein the third local pedigree fragment is stored on the remote device;
    storing, by the computing device, a pointer in the pedigree object, wherein the pointer further comprises data to identity the third local pedigree fragment; and
    updating, by the computing device, data of the pedigree object control to indicate the storage location of the pointer in the pedigree object.

17. The method of claim 11, wherein the document further comprises a restricted pointer, the restricted pointer identifying a restricted remote pedigree fragment stored on a remote device, wherein the restricted remote pedigree fragment further comprises pedigree data that is accessible only with sufficient authorization credentials.

18. The method of claim 17, further comprising:
    sending, by the computing device, one or more authorization credentials and a request for the restricted remote pedigree fragment to the remote device that retrieves the restricted remote pedigree fragment based on the authorization credentials; and
    receiving, by the computing device and from the remote device, the restricted remote pedigree fragment.

19. The method of claim 11, wherein the pointer comprises a unique identifier of a remote resource stored on the remote device, and wherein the remote pedigree fragment is associated with the remote resource.

20. The method of claim 19, wherein selecting, by the computing device, the pointer included in the document further comprises:
    selecting, by the computing device, an association from an index based on the pointer, wherein the association comprises data associating the unique identifier of the remote resource and a location identifier of the remote resource;
    identifying, by the computing device, the remote resource based on the location identifier of the remote resource; and
    requesting, by the computing device, the remote pedigree fragment associated with the remote resource.

21. The method of claim 20, wherein the remote resource is a second document stored on the remote device that includes the remote pedigree fragment.

22. A method comprising:
    receiving, by a computing device, a request to identity progeny of a primary resource, the primary resource included in a document, wherein the progeny include one or more descendent resources of the primary resource, wherein the descendent resources of the primary resource represent a plurality of resources that derive one or more asserted facts from the primary resource, and wherein a primary identifier is associated with the primary resource, the primary identifier uniquely identifying the primary resource;
    selecting, by the computing device, an association from an index based on primary identifier, wherein the association comprises data associating the primary identifier, a descendent identifier, and a location identifier of the descendent resource, wherein the descendent identifier uniquely identifies a descendent resource, and wherein the association indicates the descendent resource derives an asserted fact from the one or more asserted facts from the primary resource; and
    identifying, by the computing device, the descendent resource based on the location identifier of the remote resource.

23. A client device comprising:
    at least one processor;
    a selection module configured to receive a request to assemble a pedigree that describes a history of origin of a primary resource, the primary resource included in a document, wherein the requested pedigree of the primary resource represents the history as a set of statements that describe relationships between the primary resource and a plurality of other resources from which an asserted fact of the primary resource was derived,
    wherein the selection module is operable to select a local pedigree fragment included in the document that specifies a first direct relationship between the primary resource and a first resource of the plurality of other resources, wherein the first direct relationship indicates that the asserted fact of the primary resource was derived from data of the first resource; and
    an assembly module configured to assemble the pedigree of the primary resource from the local pedigree fragment and output the assembled pedigree.

24. The client device of claim 23, wherein the request to assemble the pedigree further comprises a resource identifier, wherein the primary resource is identified by the resource identifier, and wherein the computing device selects the local pedigree fragment based on the resource identifier.

25. The client device of claim 23, wherein the document further comprises a pedigree object that stores the local pedigree fragment and a pedigree object control.

26. The client device of claim 25, wherein the selection module is further configured to:
    select data from the pedigree object control to identify a storage location of the local pedigree fragment in the pedigree object; and
    select the local pedigree fragment from the storage location based on the data from the pedigree object control.

27. The client device of claim 25, wherein the selection module is further configured to:
  generate a second local pedigree fragment in response to growth of the pedigree of the primary resource;
  store the second local pedigree fragment in the pedigree object; and,
  update data of the pedigree object control to indicate the storage location of the second local pedigree fragment in the pedigree object.

28. The client device of claim 23, wherein the document further comprises a restricted local pedigree fragment, the restricted local pedigree fragment further comprising encrypted data, and wherein the selection module is further configured to:
  select the restricted local pedigree fragment;
  determine the restricted local pedigree fragment includes encrypted data; and
  decrypt the restricted local pedigree fragment.

29. The client device of claim 28, wherein the selection module is further configured to:
  send the restricted local pedigree fragment and one or more authorization credentials to a remote device that decrypts the restricted local pedigree fragment based on the authorization credentials; and
  receive data of the restricted local pedigree fragment from the remote device.

30. The client device of claim 28, wherein the selection module is further configured to:
  determine a decryption operation, wherein the decryption operation decrypts the encrypted data of the restricted local pedigree fragment based on a key.

31. The client device of claim 23, wherein the selection module is further configured to:
  receive data that instructs the computing device to send the document to a recipient in an untrusted domain;
  applying an encryption operation to encrypt the local pedigree fragment included in the document; and
  send the document to the recipient in the untrusted domain.

32. The client device of claim 23, wherein, the selection module is further configured to:
  receive data that instructs the computing device to send the document to a recipient in an untrusted domain;
  remove the local pedigree fragment from the document;
  send the local pedigree fragment to a remote device that stores the local pedigree fragment, wherein the local pedigree fragment stored on the remote device is accessible only with sufficient authorization credentials;
  generate a pointer that identifies the local pedigree fragment stored on the remote device;
  store the pointer in the document; and
  send the document to the recipient in the untrusted domain.

33. The client device of claim 23, wherein the selection module is further configured to:
  select a pointer included in the document that identifies a first remote pedigree fragment not included in the document and stored on a remote device, the first remote pedigree fragment specifying a second direct relationship between the first resource and a second resource of the plurality of other resources, wherein the second direct relationship indicates that the first resource was derived from the second resource; and
  send a remote request based on the pointer to the remote device to request the first remote pedigree fragment; and
  receive the first remote pedigree fragment from the remote device.

34. The client device of claim 33, wherein the pointer further comprises data to identify the first remote pedigree fragment stored on a remote device, the pointer further comprising a memory address, file name, uniform resource identifier, or hash code.

35. The client device of claim 33, wherein the assembly module is further configured to assemble the pedigree of the primary resource from the first remote pedigree fragment.

36. The client device of claim 33, wherein the document further comprises a pedigree object, and wherein the pedigree object further includes the local pedigree fragment, a pedigree object control, and the pointer.

37. The client device of claim 33, wherein the selection module is further configured to:
  select a second pointer included in the document that identifies a second remote pedigree fragment not included in the document and stored on a remote device, the second remote pedigree fragment specifying an indirect relationship between the primary resource and a third resource of the plurality of other resources, wherein the indirect relationship indicates that the primary resource was derived from the third resource;
  send a remote request based on the second pointer to the remote device to request the second remote pedigree fragment; and
  receive the second remote pedigree fragment from the remote device.

38. The method of claim 35, wherein the selection module is further configured to:
  generate a third local pedigree fragment in response to growth of the pedigree of the primary resource;
  send the third local pedigree fragment to a remote device, wherein the third local pedigree fragment is stored on the remote device;
  store a pointer in the pedigree object, wherein the pointer further comprises data to identify the third local pedigree fragment; and
  update data of the pedigree object control to indicate the storage location of the pointer in the pedigree object.

39. The client device of claim 33, wherein the document further comprises a restricted pointer, the restricted pointer identifying a restricted remote pedigree fragment stored on a remote device, wherein the restricted remote pedigree fragment further comprises pedigree data that is accessible only with sufficient authorization credentials.

40. The client device of claim 39, wherein the selection module is further configured to:
  send one or more authorization credentials and a request for the restricted remote pedigree fragment to the remote device that retrieves the restricted remote pedigree fragment based on the authorization credentials; and
  receive the restricted remote pedigree fragment from the remote device.

41. The client device of claim 33, wherein the pointer comprises a unique identifier of a remote resource stored on the remote device, and wherein the remote pedigree fragment is associated with the remote resource.

42. The client device of claim 41, wherein the selection module is further configured to:
  select an association from an index based on the pointer, wherein the association comprises data associating the unique identifier of the remote resource and a location identifier of the remote resource;
  identify the remote resource based on the location identifier of the remote resource; and
  request the remote pedigree fragment associated with the remote resource.

43. The client device of claim 42, wherein the remote resource is a second document stored on the remote device that includes the remote pedigree fragment.

44. A client device comprising at least one processor configured to:
- receive a request to identify progeny of a primary resource, the primary resource included in a document, wherein the progeny include one or more descendent resources of the primary resource, wherein the descendent resources of the primary resource represent a plurality of resources that derive one or more asserted facts from the primary resource, and
- wherein a primary identifier is associated with the primary resource, the primary identifier uniquely identifying the primary resource;
- select an association from an index based on primary identifier, wherein the association comprises data associating the primary identifier, a descendent identifier, and a
- location identifier of the descendent resource, wherein the descendent identifier uniquely identifies a descendent resource, and wherein the association indicates the descendent resource derives an asserted fact from the one or more asserted facts from the primary resource; and
- identify the descendent resource based on the location identifier of the remote resource.

* * * * *